United States Patent
Chang et al.

(10) Patent No.: US 10,986,511 B2
(45) Date of Patent: Apr. 20, 2021

(54) BASE STATION AND OPERATION METHOD THEREOF AND COMMUNICATION SYSTEM

(71) Applicant: Industrial Technology Research Institute, Hsinchu (TW)

(72) Inventors: Hsien-Wen Chang, Hsinchu (TW); Shih-Hao Fang, Hsinchu County (TW); Jen-Yuan Hsu, Kinmen County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/232,632

(22) Filed: Dec. 26, 2018

(65) Prior Publication Data

US 2020/0162937 A1 May 21, 2020

(30) Foreign Application Priority Data

Nov. 20, 2018 (TW) ................................ 107141156

(51) Int. Cl.
*H04W 16/28* (2009.01)
*H04B 1/02* (2006.01)
(Continued)

(52) U.S. Cl.
CPC ............. *H04W 16/28* (2013.01); *H04B 1/02* (2013.01); *H04B 17/19* (2015.01); *H04B 2001/0416* (2013.01); *H04W 88/08* (2013.01)

(58) Field of Classification Search
CPC .............................. H04W 88/08; H04W 16/28
See application file for complete search history.

(56) References Cited

U.S. PATENT DOCUMENTS

| 6,415,163 B1 * | 7/2002 | Keskitalo | H04B 1/76 455/562.1 |
|---|---|---|---|
| 6,574,460 B1 | 6/2003 | Lindenmeier et al. | |

(Continued)

FOREIGN PATENT DOCUMENTS

| CN | 103840873 A | 6/2014 |
|---|---|---|
| TW | I602400 B | 10/2017 |
| WO | WO 2007050544 A2 | 5/2007 |

OTHER PUBLICATIONS

Gao et al., "Multi-Switch for Antenna Selection in Massive MIMO," 2015 IEEE Global Communications Conference (GLOBECOM), Dec. 2015, 6 pages, IEEE, US.

(Continued)

*Primary Examiner* — Charles N Appiah
*Assistant Examiner* — Frank E Donado

(57) ABSTRACT

A base station includes a processing unit, a plurality of radio frequency units, a plurality of antenna units, a control unit and an adjustment unit. The processing unit generates a baseband signal and provides a control strategy. The radio frequency units receive the baseband signal to generate a plurality of radio frequency signals. The antenna units transmit a plurality of output signals. The control unit receives the control strategy and generates a plurality of control signals according to the control strategy. The adjustment unit receives the radio frequency signals and the control signals, switches the connection of RF paths with high-gain or low-gain between the radio frequency units and the antenna units and adjusts gains of the radio frequency signals according to the control signals, so as to generate the output signals.

18 Claims, 6 Drawing Sheets

(51) Int. Cl.
*H04B 17/19* (2015.01)
*H04W 88/08* (2009.01)
*H04B 1/04* (2006.01)

(56) References Cited

U.S. PATENT DOCUMENTS

| | | |
|---|---|---|
| 6,642,908 B2 | 11/2003 | Pleva et al. |
| 8,577,308 B2 | 11/2013 | Choi et al. |
| 9,654,198 B2 | 5/2017 | Nilsson et al. |
| 10,056,957 B2 | 8/2018 | Han et al. |
| 2015/0358055 A1 | 12/2015 | Molisch et al. |
| 2016/0150591 A1* | 5/2016 | Tarighat Mehrabani ............... H04W 52/38 370/329 |
| 2016/0353424 A1* | 12/2016 | Stirling-Gallacher ............... H04B 7/0626 |
| 2017/0094594 A1* | 3/2017 | Kim ............... H04W 52/0206 |
| 2017/0331532 A1 | 11/2017 | Le-Ngoc |

OTHER PUBLICATIONS

Park et al., "Dynamic subarrays for hybrid precoding in wideband mmWave MIMO systems," IEEE Transactions on Wireless Communications, May 2017, pp. 2907-2920, vol. 16, Issue 5, IEEE, US.

Alkhateeb et al., "Massive MIMO Combining with Switches," IEEE Wireless Communications Letters, Jun. 2016, pp. 232-235, vol. 5, No. 3, IEEE, US.

Kim et al., "A Simple Switched Beamforming Network for Four-Beam Butler Matrix," Microwave and Optical Technology Letters, Jun. 2009, pp. 1413-1416, vol. 51, No. 6, Wiley, US.

Bialkowski et al., "A Beamforming Network for a Compact Circular Switched-Beam Array Antenna," IEEE Microwave and Wireless Components Letters. 1999, pp. 869-872, vol. 11, Issue 1, IEEE. US.

M. Krairiksh, "Phased Array of Switched-beam Elements and its Applications," 2009 Applied Electromagnetics Conference (AEMC), Dec. 2009, 4 pages, IEEE, US.

Omran et al., "Beam-Forming Network Using Switch-line Phase Shifter," 2007 Asia-Pacific Conference on Applied Electromagnetics, Dec. 2007, 5 pages, IEEE, US.

"Wideband Analog Phase Shifters Cover 2 to 24 GHz," Microwave Journal, Feb. 2011, 2 pages, Hittite Microwave Corp, US.

"Phased array antenna _ diario SWL I5-56578 Antonio," http://i56578-swl.blogspot.com/2015/02/phased-array-antenna.html, Feb. 2015, 5 pages.

Taiwan Patent Office, Office Action, Patent Application Serial No. 107141156, dated Jun. 17, 2019, Taiwan.

* cited by examiner

BASE STATION AND OPERATION METHOD THEREOF AND COMMUNICATION SYSTEM

CROSS-REFERENCE TO RELATED APPLICATION

The present application is based on, and claims priority from, Taiwan Application Serial Number 107141156, filed Nov. 20, 2018, the disclosure of which is hereby incorporated by reference herein in its entirety.

TECHNICAL FIELD

The present disclosure relates to a base station, an operation method thereof, and a communication system.

BACKGROUND

In a wireless communication system, the antenna array is often used to form beams, thereby improving signal quality, reducing interference, and increasing system capacity. With the evolution of technology, the 3GPP International Telecommunications Organization has successively completed the development of next-generation communication systems (i.e. New Radio, NR), wherein the key technologies of beamforming and related signal processing are different from those of previous generation systems.

When a fully-digital structure is used for signal processing of a general antenna array, although the optimal theoretical performance may be achieved, an RF chain is required for each antenna, which includes a digital-to-analog converter, a filter, upconverters, power amplifiers, etc. Since the number of antennas of the antenna array is higher (generally greater than 16), problems such as high cost and high power consumption exist for a general commercial conveyor. Therefore, a hybrid structure is proposed to improve this problem. The signal processing of beamforming is divided into a digital terminal and an analog terminal, and it may greatly reduce the number of analog components required and achieve similar system performance.

Analog beamforming can be implemented by using a phase shifter network (PSN). Two common structures are a fully-connected structure and a sub-connected structure. The fully-connected structure can form a finer beam, but requires a larger number of components, and thus the cost and the power consumption are higher. The sub-connected structure has advantages in terms of cost and energy efficiency, but the formed beam direction thereof and the beam gain are limited by the lower number of components. Therefore, how to reduce the complexity of circuit design, reduce the usage number of circuit components and maintain the performance of signal transmission have become important issues.

SUMMARY

The present disclosure provides a base station, which includes a processing unit, a plurality of radio frequency (RF) units, a plurality of antenna units, a control unit and an adjusting unit. The processing unit generates a baseband signal and provides a control strategy. The radio frequency units are coupled to the processing unit and receive the baseband signal to generate a plurality of radio frequency signals. The antenna units transmit a plurality of output signals. The control unit is coupled to the processing unit, receives the control strategy, and generates a plurality of control signals according to the control strategy. The adjusting unit is coupled to the control unit, the radio frequency units and the antenna units, receives the radio frequency signals and the control signals, switches the connection between the radio frequency units and the antenna units according to the control signals, so as to adjust gains of the radio frequency signals by connecting to RF paths with high-gain or low-gain units and generate the output signals.

The present disclosure provides an operation method of a base station, which includes the following steps. A baseband signal is generated and a control strategy is provided. A plurality of radio frequency signals are generated according to the baseband signal. A plurality of control signals are generating according to the control strategy. Gains of the radio frequency signals are adjusted by connecting to RF paths with high-gain or low-gain units according to the control signals, so as to generate a plurality of output signals. The output signals are transmitted.

The present disclosure provides a communication system, which includes at least one user equipment and a base station. The base station includes a processing unit, a plurality of radio frequency units, a plurality of antenna units, a control unit and an adjusting unit. The processing unit generates a baseband signal and provides a control strategy. The radio frequency units are coupled to the processing unit and receive the baseband signal to generate a plurality of radio frequency signals. The antenna units transmit a plurality of output signals to the user equipment. The control unit is coupled to the processing unit, receives the control strategy, and generates a plurality of control signals according to the control strategy. The adjusting unit is coupled to the control unit, the radio frequency units and the antenna units, receives the radio frequency signals and the control signals, switches the connection between the radio frequency units and the antenna units according to the control signals, so as to adjust gains of the frequency signals and generate the output signals.

BRIEF DESCRIPTION OF DRAWINGS

The present disclosure can be more fully understood by reading the subsequent detailed description and examples with references made to the accompanying drawings, wherein.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

Figure 1:
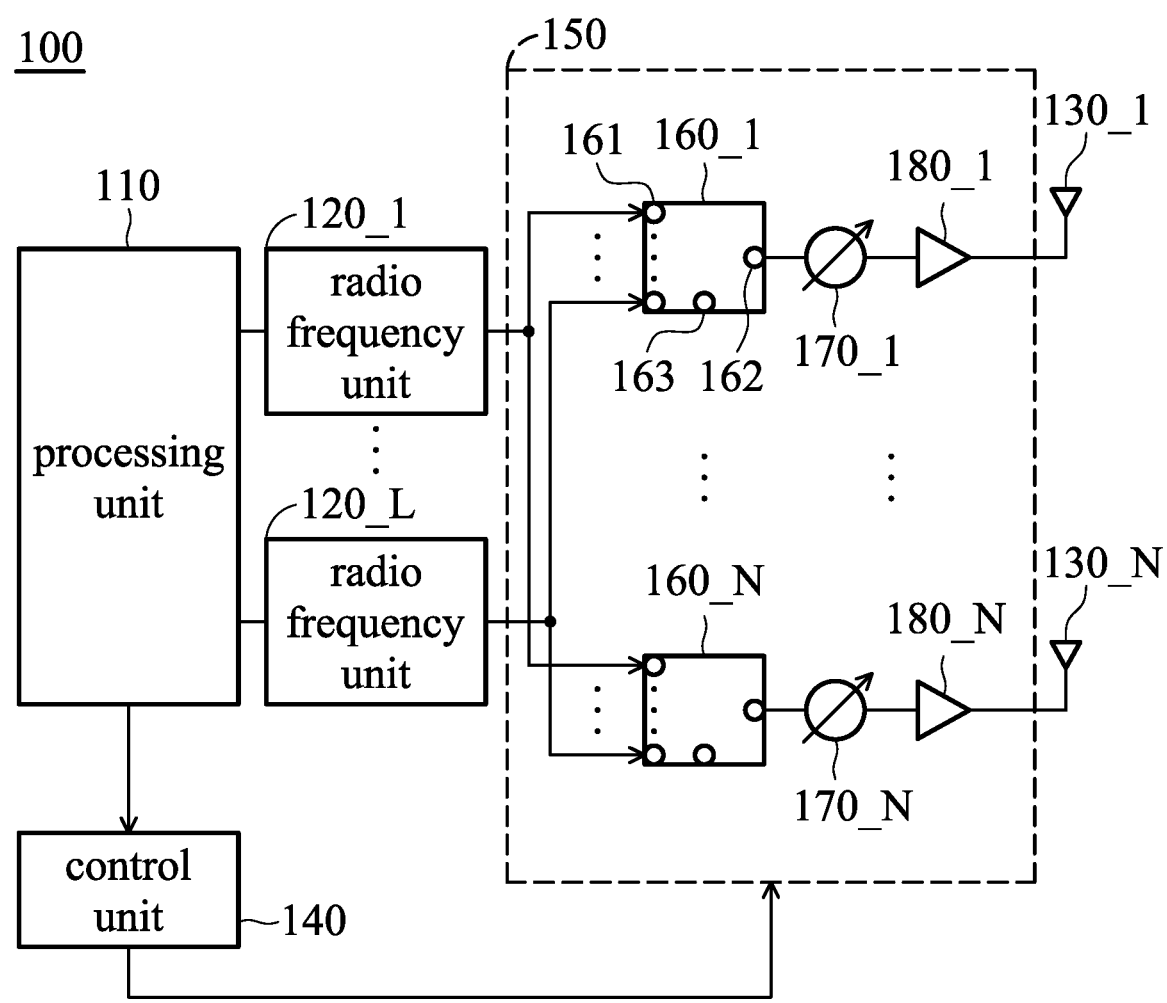
FIG. 1 shows a schematic view of a base station according to an embodiment of the present disclosure.

FIG. 1 shows a schematic view of a base station according to an embodiment of the present disclosure. Please refer to FIG. 1, the base station 100 includes a processing unit 110, a plurality of radio frequency units 120_1~120_L, a plurality of antenna units 130_1~130_N, a control unit 140 and an adjusting unit 150, wherein L and N are positive integers greater than 1, and L and N are different.

The processing unit 110 generates a baseband signal and provides a control strategy. In the embodiment, the control strategy comprises at least one of a signal emission schedule, a signal transmission distance, a user equipment state, a priority, a bandwidth efficiency and an energy efficiency, or a combination thereof. The signal emission schedule indicates the schedule that the base station 100 intends to provide services to the user equipment. For example, if the number of user equipment that the base station 100 needs to provide the services is five, then the signal emission schedule may be sorted or arranged according to five pieces of user equipment, such that the base station 100 may provide the services to the corresponding user equipment at the corresponding time point.

The signal transmitting distance indicates the distance between the base station 100 and the user equipment. For example, when the signal transmitting distance is longer, it indicates that the distance between the user equipment and the base station 100 is long, the base station 100 needs to distribute the higher number of antenna units for signal transmission or provide the output signals with higher gain. When the signal transmitting distance is shorter, it indicates that the distance between the user equipment and the base station 100 is short, the base station 100 may distribute the lower number of antenna units for signal transmission or provides the output signal with lower gain.

The user equipment state includes the mobility of the user equipment. For example, when the mobility of the user equipment is higher, the base station 100 may distribute the higher number of antenna units for signal transmission or provide the output signals with higher gain, such that the user equipment with higher mobility may obtain better signal receiving strength. In addition, when the mobility of the user equipment is lower, the base station 100 may distribute the higher number of antenna units for signal transmission or provide the output signals with higher gain, such that the user equipment with lower mobility or static state may obtain better signal receiving strength.

The priority indicates the priority of the base station 100 to provide services to the user equipment. Assuming that the number of user equipment is 5, wherein the priority sequence is a third user equipment, a second user equipment, a fifth user equipment, a first user equipment, and a fourth user equipment. For the third user equipment, the base station 100 may distribute the higher number of antenna units for signal transmission or provide the output signals with higher gain, such that the third user equipment may obtain better signal receiving strength. The remaining pieces of user equipment sequentially reduce the number of antenna units or reduce the gain of the output signals.

The bandwidth efficiency indicates the maximum signal strength received by the user equipment. When the base station 100 considers the bandwidth efficiency, the base station 100 may distribute the higher number of antenna units for signal transmission or provide the output signals with higher gain, such that the user equipment may obtain better signal receiving strength.

The energy efficiency indicates the power consumption of the base station 100. When the base station 100 considers the energy efficiency, for example the power consumption of the base station 100 needs to be reduced, the base station 100 may distribute the minimum number of antenna units for signal transmission or provide the output signals with lowest gain according to the normal service being capable of maintaining the user equipment. Thereby achieving the effect of power saving and reducing the impact of interference.

The radio frequency units 120_1~120_L are coupled to the processing unit 110 and receive the baseband signal to generate a plurality of radio frequency signals. In the embodiment, the radio frequency units 120_1~120_L are, for example, radio frequency chains (RF chain).

The antenna units 130_1~130_N transmit a plurality of output signals. That is, the output signals generated by the base station 100 are transmitted to the external user equipment through the antenna units 130_1~130_N, to provide to the user equipment for usage and provide the corresponding services.

The control unit 140 is coupled to the processing unit 110, receives the control strategy, and generates a plurality of control signals according to the control strategy. That is, the control unit 140 may generate the control signals according to information of the control strategy.

The adjusting unit 150 is coupled to the control unit 140, the radio frequency units 120_1~120_L and the antenna units 130_1~130_N. The adjusting unit 150 receives the radio frequency signals and the control signals, and switches the connection between the radio frequency units 120_1~120_L and the antenna units 130_1~130_N according to the control signals, so as to adjust gains of the frequency signals and generate the output signals.

The adjusting unit 150 includes a plurality of switching units 160_1~160_N, a plurality of phase shifters 170_1~170_N and a plurality of gain units 180_1~180_N.

The switching units 160_1~160_N each have a plurality of first terminals 161, a second terminal 162 and a control terminal 163. The first terminals 161 of the switching units 160_1~160_N are coupled to the radio frequency units 120_1_120_L. The control terminals 163 of the switching units 160_1~160_N receive the control signals. The number of first terminals 161 of the switching units 160_1~160_N corresponds to the number of radio frequency units 120_1~120_L, i.e., the number of first terminals 161 for each of the switching units 160_1~160_N is also L. Each of the switching units 160_1~160_N may be coupled to the radio frequency units 120_1~120_L. For example, the switching unit 160_1 may be coupled to the radio frequency units 120_1~120_L, the switching unit 160_2 may be coupled to the radio frequency units 120_1~120_L, . . . , the switching unit 160_N may be coupled to the radio frequency units 120_1~120_L.

The phase shifters 170_1~170_N are coupled to the corresponding second terminals 162 of the switching units 160_1~160_N. For example, the phase shifter 170_1 is coupled to the second terminal 162 of the switching unit 160_1, the phase shifter 170_2 is coupled to the second terminal 162 of the switching unit 160_2, . . . , the phase shifter 170_N is coupled to the second terminal 162 of the switching unit 160_N. In the embodiment, the phase of each of the phase shifters 170_1~170_N may be identical or different, such that the phases of the output signals generated by the adjusting unit 150 are identical or different, so as to form beams with identical or different beam directions.

The gain units 180_1~180_N are coupled to the corresponding phase shifters 170_1~170_N and the corresponding antenna units 130_1~130_N. For example, the gain unit 180_1 is coupled to the corresponding phase shifter 170_1 and the corresponding antenna unit 130_1, the gain unit 180_2 is coupled to the corresponding phase shifter 170_2 and the corresponding antenna unit 130_2, . . . , the gain unit 180_N is coupled to the corresponding phase shifter 170_N and the corresponding antenna unit 130_N.

In the embodiment, the gain units 180_1~180_N includes a plurality of first sub gain units and a plurality of second sub gain units. For example, the first sub gain units, are for example, the gain units 180_$i$, and the second sub gain units, are for example, the gain units 180_$j$, wherein i=1, 3, 5, . . . , N−1 and j=2, 4, 6, . . . , N. This embodiment is merely an exemplary embodiment of the present disclosure, and is not limit the present disclosure. The user may also adjust the distribution relationship between the first sub gain units and the second sub gain units according to the requirement thereof.

The first sub gain units 180_$i$ and the second sub gain units 180_$j$ are respectively coupled to the corresponding phase shifters 170_1~170_N and the corresponding antenna units 130_1~130_N. For example, the first sub gain unit 180_1 is coupled to the corresponding phase shifter 170_1 and the corresponding antenna unit 130_1, the second sub gain unit 180_2 is coupled to the corresponding phase shifter 170_2 and the corresponding antenna unit 130_2, . . . , the first sub gain unit 180_N−1 is coupled to the corresponding phase shifter 170_N−1 and the corresponding antenna unit 130_N−1, and the second sub gain unit 180_N is coupled to the corresponding phase shifter 170_N and the corresponding antenna unit 130_N.

The sum of the number of first sub gain units 180_$i$ and the second sub gain units 180_$j$ corresponds to the number of phase shifters 170_1~170_N, i.e., i+j=N. In addition, gains of the first sub gain units 180_$i$ are greater than gains of the second sub gain units 180_$j$. That is, the first sub gain units 180_$i$ are, for example, power amplifiers with high gain and the second sub gain units 180_$j$ are, for example, power amplifiers with low gain. Therefore, the base station 100 in the embodiment may provide output signals with different powers according to different requirements, to increase convenience of use.

In the whole operation, the control unit 140 generates the corresponding control signals to the control terminals 163 of the switching units 160_1~160_N through the control strategy provided by the processing unit 110. The switching units 160_1~160_N may switch the connection between the radio frequency units 120_1~120_L and the corresponding phase shifters 170_1~170_N according to the above control signals, such that the phase and gain process are performed for the radio frequency signals outputted by the radio frequency units 120_1~120_L with high gain or low gain requirements through the phase shifters 170_1~170_N and the gain units 180_1~180_N, so as to generate the output signals. Then, the output signals are outputted through the antenna units 130_1~130_N.

Alternatively, the switching units 160_1~160_N may disconnect a part of connections between the radio frequency units 120_1~120_L and the phase shifters 170_1~170_N, to reduce the power consumption of the base station 100 and achieve the effect of power saving.

In addition, the processing unit 110 may further receive a plurality of return signals generated by at least one user equipment (not shown) through the antenna units 130_1~130_N and establish the control strategy according to the return signals. The return signals are generated by the user equipment in response to a plurality of test signals provided by the base station 100. That is, before the processing unit 110 provides the above control strategy, the processing unit 110 may provide the test signals to the user equipment through the radio frequency units 120_1~120L, the adjusting unit 140 and the antenna units 130_1~130_N.

After the user equipment receives the test signals, the user equipment may generate the corresponding return signals in response to the received test signals, such that the antenna units 130_1~130_N can receive the return signals. Then, the return signals are transmitted to the processing unit 110 through the antenna units 130_1~130_N, the adjusting unit 140 and the radio frequency units 120_1~120L. The processing unit 110 may establish and adjust the control strategy according to the return signals, such that the control unit 140 provides the control signals to the adjusting unit 150 according to the control strategy, and thus the base station 100 performs the corresponding operation.

Figure 2:
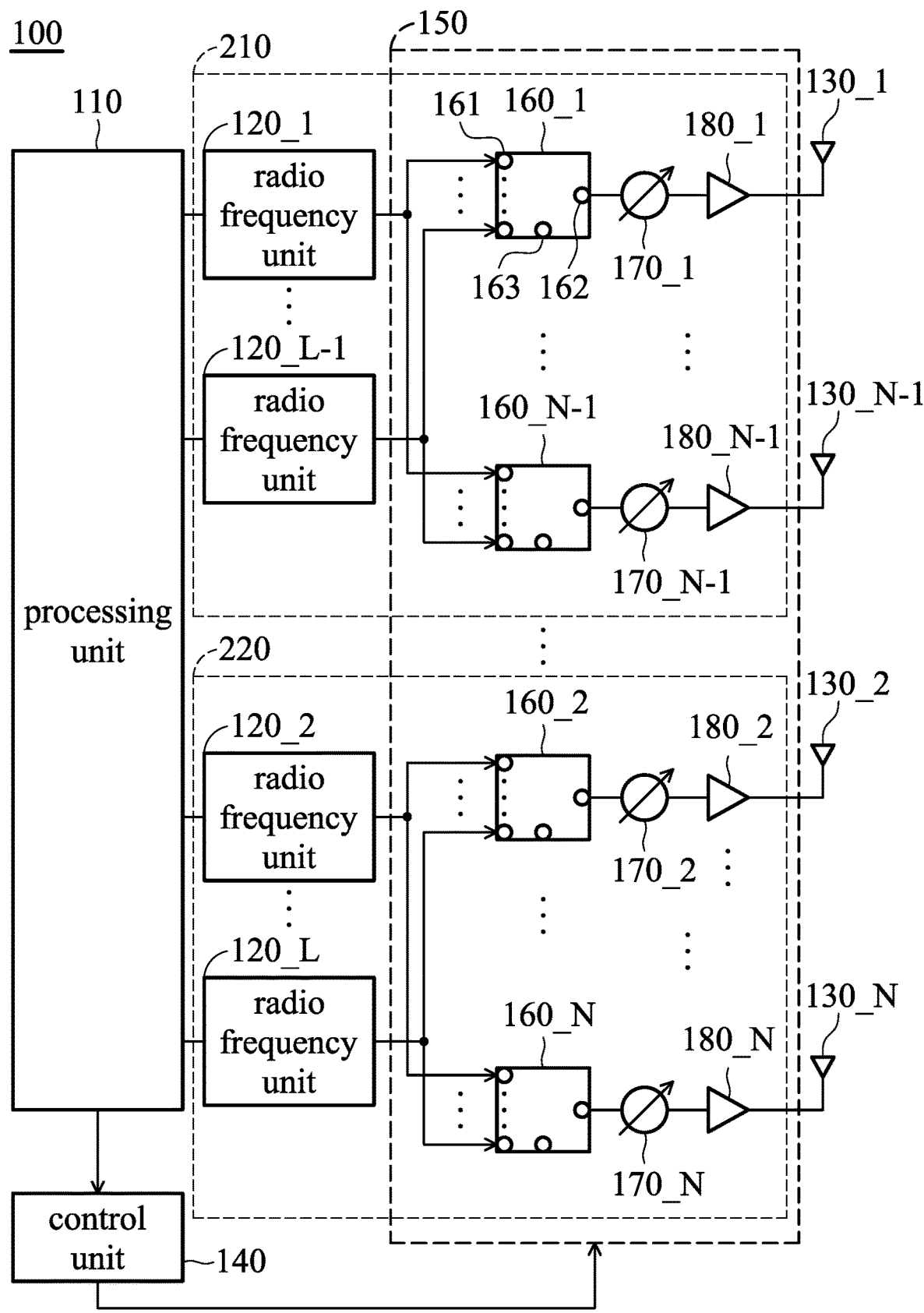
FIG. 2 shows a schematic view of a base station according to another embodiment of the present disclosure.

FIG. 2 shows a schematic view of a base station according to another embodiment of the present disclosure. The base station 100 in the embodiment is substantially the same as the base station 100 in FIG. 1. That is, the base station 100 in FIG. 2 still includes a processing unit 110, a plurality of radio frequency units 120_1~120_L, a plurality of antenna units 130_1~130_N, a control unit 140 and an adjusting unit 150, wherein L and N are positive integers greater than 1, and L and N are different. The processing unit 110, the radio frequency units 120_1~120_L, the antenna units 130_1~130_N, the control unit 140 and the adjusting unit 150 in FIG. 2 may be described by the embodiment in FIG. 1, and the description thereof is not repeated here.

In the embodiment, the adjusting unit 150 includes a plurality of switching units 160_1~160_N, a plurality of phase shifters 170_1~170_N and a plurality of gain units 180_1~180_N. The gain units 180_1~180_N include a plurality of first sub gain units and a plurality of second sub gain units. The first sub gain units are, for example, the gain units 180_$i$ and the second sub gain units are, for example, the gain units 180_$j$, wherein i=1, 3, 5, . . . , N−1 and j=2, 4, 6, . . . , N. This embodiment is merely an exemplary embodiment of the present disclosure, and is not limit the present disclosure. The user may also adjust the distribution relationship between the first sub gain units and the second sub gain units according to the requirement thereof.

The first sub gain units 180_$i$, a part of the switching units 160_1~160_N (i.e., the switching units 160_$i$), a part of the phase shifters 170_1~170_N (i.e., the phase shifters 170_$i$), a part of the antenna units 130_1~130_N (i.e., the antenna units 130_$i$) and a part of the radio frequency units 120_1~120_L (i.e., the radio frequency units 120_$k$) form a first group 210, wherein k=1, 3, 5, . . . , L−1. That is, the first terminals 161 of the switching units 160_$i$ are coupled to the radio frequency units 120_$k$ and the number of first terminals 161 of the switching units 160_$i$ corresponds to the number of radio frequency units 120_$k$. The phase shifters 170_$i$ are coupled to the second terminals 162 of the switching units 160_$i$. The first sub gain units 180_$i$ are coupled to the phase shifters 170_$i$ and the antenna units 130_$i$.

In addition, the second sub gain units 180_$j$, another part of the switching units 160_1~160_N (i.e., the switching units 160_$j$), another part of the phase shifters 170_1~170_N (i.e., the phase shifters 170_$j$), another part of the antenna units 130_1~130_N (i.e., the antenna units 130_$j$) and another part of the radio frequency units 120_1~120_L (i.e., the radio frequency units 120_*m*) form a second group 220, wherein m=2, 4, 6, . . . , L. That is, the first terminals 161 of the switching units 160_*j* are coupled to the radio frequency units 120_*m* and the number of first terminals 161 of the switching units 160_*j* corresponds to the number of radio frequency units 120_*m*. The phase shifters 170_*j* are coupled to the second terminals 162 of the switching units 160_*j*. The first sub gain units 180_*j* are coupled to the phase shifters 170_*j* and the antenna units 130_*j*.

Furthermore, gains of the first sub gain units 180_*i* are greater than gains of the second sub gain units 180_*j*. That is, the first sub gain units 180_*i* are, for example, power amplifiers with high gain and the second sub gain units 180_*j* are, for example, power amplifier with low gain.

It can be seen that the first group 210 is a group for generating the output signals with high gain and the second group 220 is a group for generating the output signals with low gain. Therefore, when the output signal with high gain is required in the control strategy, the control unit 140 may select the operation of the components of the first group 210, such that the antenna units 130_*i* can transmit the output signals with high gain. When the output signal with low gain is required in the control strategy, the control unit 140 may select the operation of the components of the second group 220, such that the antenna units 130_*j* can transmit the output signals with low gain.

Moreover, the processing unit 110 may further receive a plurality of return signals generated by at least one user equipment (not shown) through the antenna units 130_1~130_N and establish the control strategy according to the return signals. The return signals are generated by the user equipment in response to a plurality of test signals provided by the base station 100. The above operation may be described by the description of the embodiment in FIG. 1, and the description thereof is not repeated here.

Figure 3:
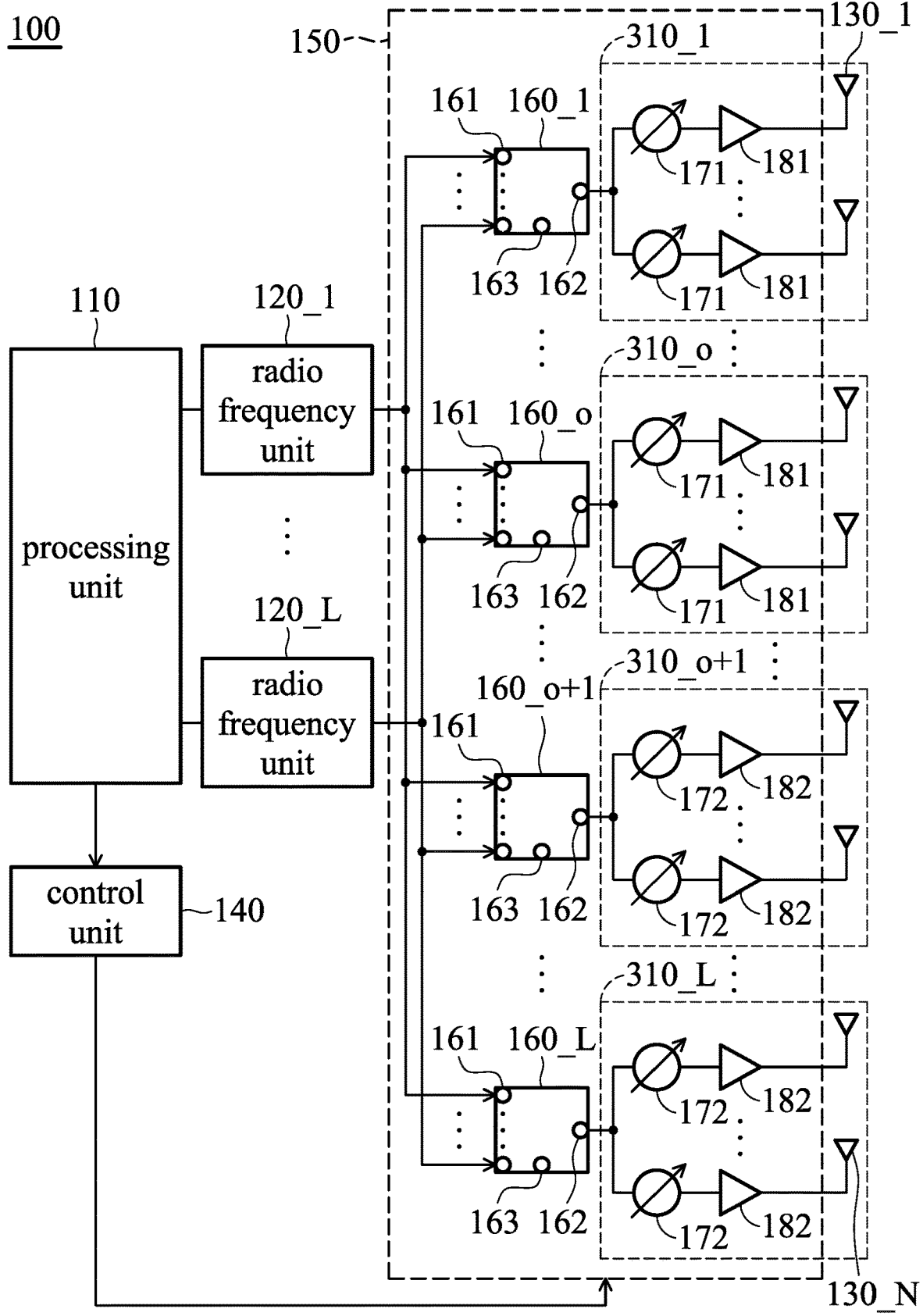
FIG. 3 shows a schematic view of a base station according to yet another embodiment of the present disclosure.

FIG. 3 shows a schematic view of a base station according to yet another embodiment of the present disclosure. The base station 100 in the embodiment is substantially the same as the base station 100 in FIG. 1, That is, the base station 100 in FIG. 3 still includes a processing unit 110, a plurality of radio frequency units 120_1~120_L, a plurality of antenna units 130_1~130_N, a control unit 140 and an adjusting unit 150, wherein L and N are positive integers greater than 1, and L and N are different. The processing unit 110, the radio frequency units 120_1~120_L, the antenna units 130_1~130_N, the control unit 140 and the adjusting unit 150 in FIG. 3 may be described by the embodiment in FIG. 1, and the description thereof is not repeated here.

In the embodiment, the adjusting unit 150 includes a plurality of switching units 160_1~160_L, a plurality of phase shifters 171 and 172 and a plurality of gain units 181 and 182. The gain units 181 and 182 include a plurality of first sub gain units and a plurality of second sub gain units. The first sub gain units are, for example, the gain units 181 and the second sub gain units are, for example, the gain units 182. This embodiment is merely an exemplary embodiment of the present disclosure, and is not limit the present disclosure. The user may also adjust the distribution relationship between the first sub gain units and the second sub gain units according to the requirement thereof.

In the embodiment, the first sub gain units 181, a part of the phase shifters 171 and a part of the antenna units 130_1~130_N form a plurality of first group 310_1~310_*o*, and the phase shifters 171 of the first group 310_1~310_*o* are coupled to the corresponding switching units, wherein o is a positive integer greater than 1. That is, the phase shifters 171 of the first group 310_1 are coupled to the switching unit 160_1, the phase shifters 171 of the first group 310_2 are coupled to the switching unit 160_2, . . . , and the phase shifters 171 of the first group 310_*o* are coupled to the switching unit 160_*o*. The number of phase shifters 171 of the first group 310_1~310_*o* and the number of first sub gain units 181 may be the same or different. The user may adjust the distribution relationship between the number of phase shifters 171 of the first group 310_1~310_*o* and the number of first sub gain units 181 according to the requirement thereof.

In addition, the second sub gain units 182, another part of the phase shifters 172 and another part of the antenna units 130_1~130_N form a plurality of second groups 310_*o*+1~310_L, and the phase shifters 172 of the first group 310_*o*+1~310_L are coupled to the corresponding switching units, wherein o<L. That is, the phase shifters 172 of the second group 310_*o*+1 are coupled to the switching unit 160_*o*+1, the phase shifters 172 of the second group 310_*o*+2 are coupled to the switching unit 160_*o*+2, . . . , and the phase shifters 172 of the second group 310_L are coupled to the switching unit 160_L. The number of phase shifters 172 of the second group 310_*o*+1~310_L and the number of second sub gain units 182 may be the same or different. The user may adjust the distribution relationship between the number of phase shifters 172 of the second group 310_*o*+1~310_L and the number of second sub gain units 182 according to the requirement thereof.

The number of switching units 160_1~160_L is the sum of the number of first groups 310_1~310_*o* and the second groups 310_*o*+1~310_L. Furthermore, the sum of the number of phase shifters 171 and the sum of the number of second sub gain units 181 and the second sub gain units 182 are the same as the number of antenna units 130_1~130_N, i.e., N. Moreover, gains of the first sub gain units 181 are greater than gains of the second sub gain units 182. That is, the first sub gain units 181 are, for example, power amplifiers (PAs) with high gain which correspond to the RF paths with high-gain, and the second sub gain units 182 are, for example, power amplifiers with low gain which correspond to the RF paths with low-gain.

It can be seen that the first group 310_1~310_*o* are groups for generating the output signals with high gain and the second group 310_*o*+1~310_L are groups for generating the output signals with low gain. Each of the radio frequency unit 120_1~120_L may be associated with the first group 310_1~310_*o* or the second group 310_*o*+1~310_L. Therefore, when the output signal with high gain to be provided is required in the control strategy, the control unit 140 may select the operation of the components of the first groups 310_1~310_*o*, such that the antenna units of the first groups 310_1~310_*o* may transmit the output signals with high gain. When the output signal with low gain to be provided is required in the control strategy, the control unit 140 may select the operation of the components of the second groups 310_*o*+1~310_L, such that the antenna units of the second groups 310_*o*+1~310_L can transmit the output signals with low gain.

Moreover, the processing unit 110 may further receive a plurality of return signals generated by at least one user equipment (not shown) through the antenna units 130_1~130_N and establish the control strategy according to the return signals. The return signals are generated by the user equipment in response to a plurality of test signals provided by the base station 100. The above operation may be described by the description of the embodiment in FIG. 1, and the description thereof is not repeated here.

Figure 4:
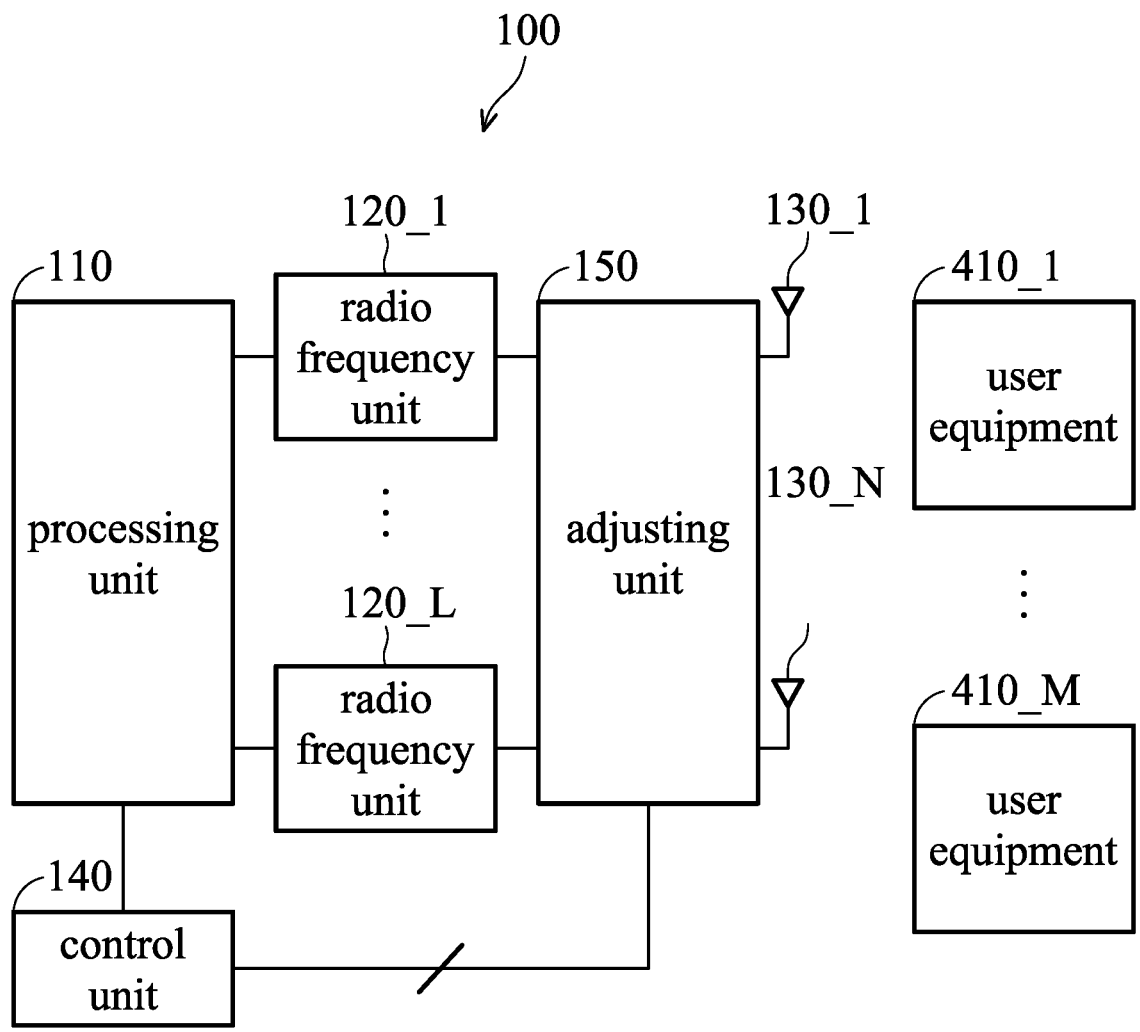
FIG. 4 shows a schematic view of a communication system according to an embodiment of the present disclosure.

FIG. 4 shows a schematic view of a communication system according to an embodiment of the present disclosure. The communication system 400 includes a number of user equipments (UEs) 410_1~410_M and the base station 100, wherein M is a positive integer greater than 0. The base station of the embodiment is the same as the base station in FIG. 1, FIG. 2 and FIG. 3. The internal components, the coupling relationship and corresponding operation of the base station 100 of the embodiment is also the same as the internal components, the coupling relationship and corresponding operation of the base station in FIG. 1, FIG. 2 and FIG. 3. Therefore, the description of the embodiment may be described by the description of the embodiment in FIG. 1, FIG. 2 and FIG. 3, and the description thereof is not repeated here.

In addition, the processing unit 110 may further provide a plurality of test signals to the user equipments 410_1~410_M through the antenna units 130_1~130_N, such that the user equipments 410_1~410_M generate a plurality of return signals in response to the test signals. The processing unit 110 receives the return signals through the antenna units 130_1~130_N and establishes the control strategy according to the return signals. The above operation may be described by the description of the embodiment in FIG. 1~FIG. 3, and the description thereof is not repeated here.

Figure 5:
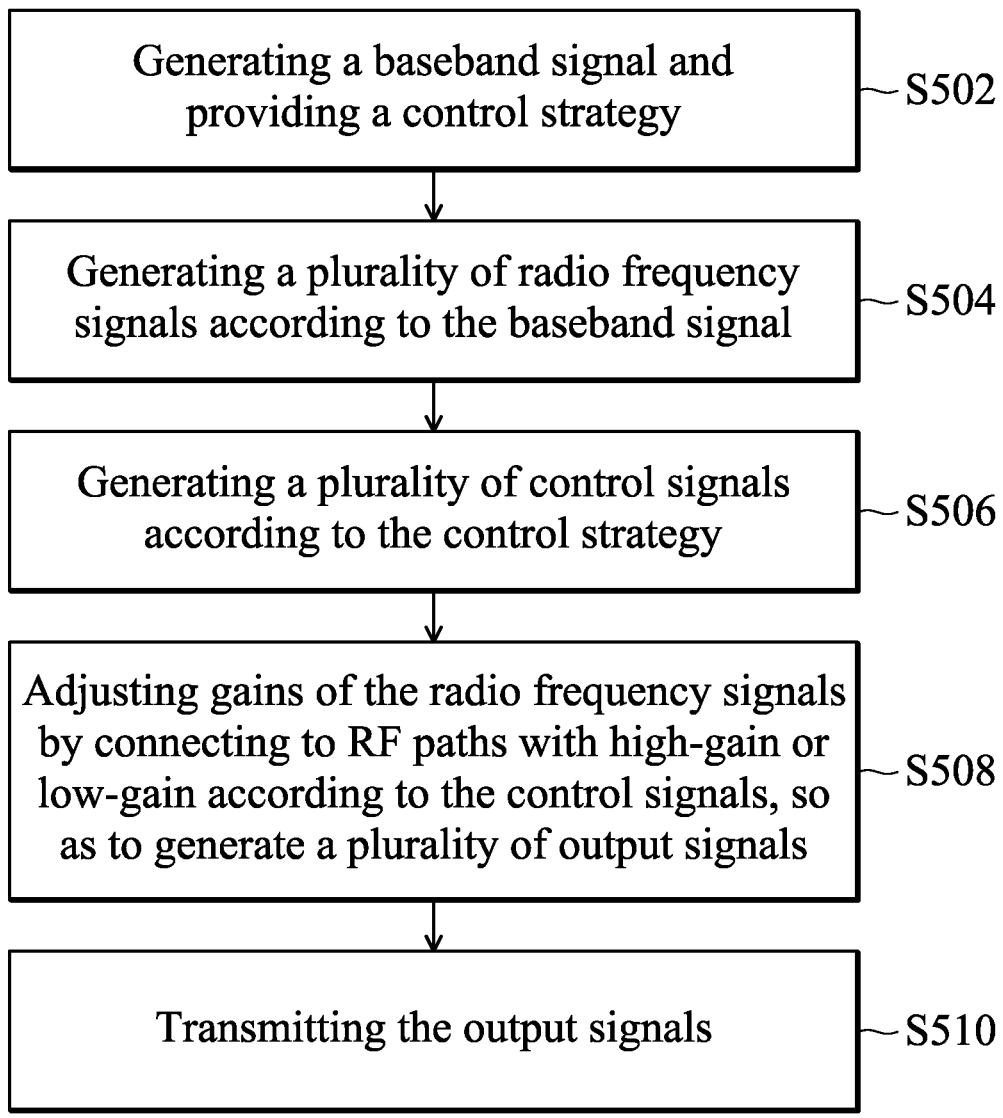
FIG. 5 shows a flowchart of an operation method of a base station according to an embodiment of the present disclosure.

According to the above-mentioned description, the above embodiments may introduce an operation method of a base station. FIG. 5 shows a flowchart of an operation method of a base station according to an embodiment of the present disclosure.

In step S502, the method involves generating a baseband signal and providing a control strategy. In step S504, the method involves generating a plurality of radio frequency signals according to the baseband signal. In step S506, the method involves generating a plurality of control signals according to the control strategy. In step S508, the method involves adjusting gains of the radio frequency signals by connecting to RF paths with high-gain or low-gain according to the control signals, so as to generate a plurality of output signals. In step S510, the method involves transmitting the output signals.

In the embodiment, the above output signals includes a plurality of first sub output signals and/or a plurality of second sub output signals, wherein gains of the first sub output signals are greater than gains of the second sub output signals. The above control strategy includes at least one of a signal emission schedule, a signal transmission distance, a user equipment state, a priority, a bandwidth efficiency and an energy efficiency, or a combination thereof.

Figure 6:
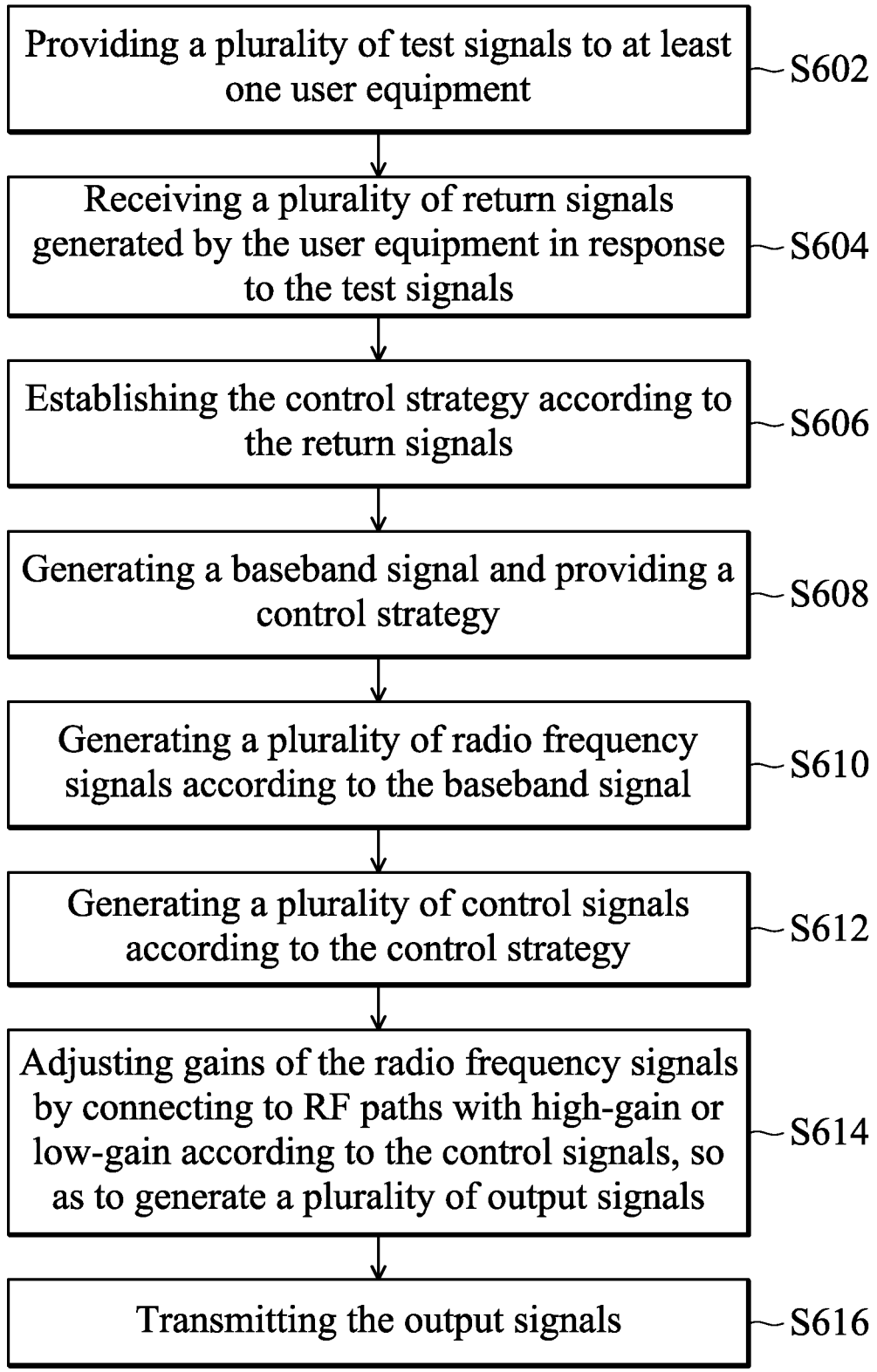
FIG. 6 shows a flowchart of an operation method of a base station according to another embodiment of the present disclosure.

FIG. 6 shows a flowchart of an operation method of a base station according to another embodiment of the present disclosure. In step S602, the method involves providing a plurality of test signals to at least one user equipment. In step S604, the method involves receiving a plurality of return signals generated by the user equipment in response to the test signals. In step S606, the method involves establishing the control strategy according to the return signals.

In step S608, the method involves generating a baseband signal and providing a control strategy. In step S610, the method involves generating a plurality of radio frequency signals according to the baseband signal.

In step S612, the method involves generating a plurality of control signals according to the control strategy. In step S614, the method involves adjusting gains of the radio frequency signals by connecting to RF paths with high-gain or low-gain according to the control signals, so as to generate a plurality of output signals. In step S616, the method involves transmitting the output signals. In the embodiment, the above output signals includes a plurality of first sub output signals and/or a plurality of second output signals, wherein gains of the first sub output signals are greater than gains of the second sub output signals. The above control strategy includes at least one of a signal emission schedule, a signal transmission distance, a user equipment state, a priority, a bandwidth efficiency and an energy efficiency, or a combination thereof.

In summary, according to the base station and the operation method thereof and the communication system, the processing unit provides the control strategy, the radio frequency units transform the baseband signal to the radio frequency signals, the control unit generates the control signals according to the control strategy, such that the adjusting unit may switch the connection of RF paths with high-gain or low-gain requirements between the radio frequency units and antenna units according to the control signals, so as to adjust gains of the frequency signals and generate the output signals, and the output signals are transmitted through the antenna units. Therefore, the complexity of the circuit design may be reduced, the number of circuit components for use may be decreased and the signal transmission efficiency may be maintained.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:
1. A base station, comprising:
a processing circuit, generating a baseband signal, and providing a control strategy;
a plurality of radio frequency circuits, directly coupled to the processing circuit, receiving the baseband signal to generate a plurality of radio frequency signals;
a plurality of antennas, transmitting a plurality of output signals;
a control circuit, coupled to the processing circuit, receiving the control strategy, and generating a plurality of control signals according to the control strategy; and
an adjusting circuit, coupled to the control circuit, the radio frequency circuits and the antennas, receiving the radio frequency signals and the control signals, and switching connection of radio frequency paths between the radio frequency circuits and the antennas according to the control signals, so as to adjust gains of the radio frequency signals and generate the output signals, wherein the processing circuit receives signals communicated between a user equipment and the base station and establishes the control strategy according to the communicated signals;
wherein the control circuit generates a plurality of control signals according to the established control strategy, and the adjusting circuit adjusts gains of the radio frequency signals by connecting to RF paths with high-gain or low-gain according to the control signals, so as to generate the plurality of output signals;
wherein the adjusting circuit comprises a plurality of gain circuits, coupled to a plurality of phase shifters and the antennas;

wherein the gain circuits comprise a plurality of sub gain circuits, a sum of the number of sub gain circuits corresponds to the number of phase shifters, and gains of the sub gain circuits are used to generate the high-gain; and wherein the control strategy comprises a user equipment state used to determine a priority, the user equipment state comprises a mobility of a user equipment, the base station provides the output signals associated with the RF paths with high-gain to the user equipment with a high priority and based on the mobility of the user equipment, and the priority indicates a priority to provide services to the user equipment.

2. The base station as claimed in claim 1, wherein the adjusting circuit comprises a plurality of switching circuits, each having a plurality of first terminals, a second terminal and a control terminal, wherein the first terminals of the switching circuits are coupled to the radio frequency circuits, and the control terminals of the switching circuits receive the control signals;

wherein the plurality of phase shifters are correspondingly coupled to the second terminals of the switching circuits; and wherein the plurality of gain circuits are correspondingly coupled to the phase shifters and the antennas; and wherein the number of first terminals of the switching circuits corresponds to the number of radio frequency circuits.

3. The base station as claimed in claim 2, wherein the gain circuits comprise a plurality of first sub gain circuits and a plurality of second sub gain circuits, the first sub gain circuits and the second sub gain circuits are correspondingly coupled to the phase shifters and the antennas, respectively, wherein a sum of the number of first sub gain circuits and the number of second sub gain circuits corresponds to the number of phase shifters, and gains of the first sub gain circuits are greater than gains of the second sub gain circuits.

4. The base station as claimed in claim 3, wherein the first sub gain circuits, a part of the switching circuits, a part of the phase shifters, a part of the antennas and a part of the radio frequency circuits form a first group, and the second sub gain circuits, another part of the switching circuits, another part of the phase shifters, another part of the antennas and another part of the radio frequency circuits form a second group.

5. The base station as claimed in claim 3, wherein the first sub gain circuits, a part of the phase shifters and a part of the antennas form a plurality of first groups, the phase shifters of the first groups are correspondingly coupled to the switching circuits, the second sub gain circuits, another part of the phase shifters and another part of the antennas form a plurality of second groups, and the phase shifters of the second groups are correspondingly coupled to the switching circuits, wherein the number of switching circuits is the sum of the first groups and the second groups.

6. The base station as claimed in claim 1, wherein the control strategy further comprises at least one of a signal emission schedule, a signal transmission distance, a bandwidth efficiency and an energy efficiency, or a combination thereof.

7. The base station as claimed in claim 1, wherein the processing circuit further receives a plurality of return signals generated by at least one user equipment through the antennas and establishes the control strategy according to the return signals, wherein the return signals are generated by the at least one user equipment in response to a plurality of test signals provided by the base station.

8. An operation method of a base station, comprising:
generating a baseband signal and providing a control strategy;
generating a plurality of radio frequency signals according to the baseband signal by a plurality of radio frequency circuits directly coupled to a processing circuit;
receiving signals communicated between a user equipment and a base station and establishes the control strategy according to the communicated signals;
generating a plurality of control signals according to the control strategy according to the established control strategy;
adjusting, by an adjusting circuit, gains of the radio frequency signals by switching connection of RF paths between the radio frequency circuits and a plurality of antennas with high-gain or low-gain according to the control signals, so as to generate a plurality of output signals, wherein the adjusting circuit comprises a plurality of gain circuits, coupled to a plurality of phase shifters and the antennas, and the gain circuits comprise a plurality of sub gain circuits, a sum of the number of sub gain circuits corresponds to the number of phase shifters, and gains of the sub gain circuits are used to generate the high-gain; and
transmitting the output signals;
wherein the control strategy comprises a user equipment state used to determine a priority, the user equipment state comprises a mobility of a user equipment, the base station provides the output signals associated with the RF paths with high-gain to the user equipment with a high priority and based on the mobility of the user equipment, and the priority indicates a priority to provide services to the user equipment.

9. The operation method of the base station as claimed in claim 8, wherein the output signals comprise a plurality of first sub output signals and/or a plurality of second output signals, wherein gains of the first sub output signals are greater than gains of the second sub output signals.

10. The operation method of the base station as claimed in claim 8, wherein the control strategy further comprises at least one of a signal emission schedule, a signal transmission distance, a bandwidth efficiency and an energy efficiency, or a combination thereof.

11. The operation method of the base station as claimed in claim 8, further comprising:
providing a plurality of test signals to at least one user equipment;
receiving a plurality of return signals generated by the at least one user equipment in response to the test signals; and
establishing the control strategy according to the return signals.

12. A communication system, comprising:
at least one user equipment; and
a base station, wherein the base station comprises:
a processing circuit, generating a baseband signal, and providing a control strategy;
a plurality of radio frequency circuits, directly coupled to the processing circuit, receiving the baseband signal to generate a plurality of radio frequency signals;
a plurality of antennas, transmitting a plurality of output signals to the at least one user equipment;

a control circuit, coupled to the processing circuits, receiving the control strategy, and generating a plurality of control signals according to the control strategy; and an adjusting circuit, coupled to the control circuit, the plurality of radio frequency circuits and the plurality of antennas, receiving the radio frequency signals and the control signals, switching the connection of radio frequency paths between the radio frequency circuits and the antennas according to the control signals, so as to adjust gains of the radio frequency signals and generate the output signals, wherein the processing circuit receives signals communicated between the user equipment and the base station and establishes the control strategy according to the communicated signals;

wherein the control circuit generates a plurality of control signals according to the established control strategy, and the adjusting circuit adjusts gains of the radio frequency signals by connecting to RF paths with high-gain or low-gain according to the control signals, so as to generate the plurality of output signals;

wherein the adjusting circuit comprises a plurality of gain circuits, coupled to a plurality of phase shifters and the antennas;

wherein the gain circuits comprise a plurality of sub gain circuits, a sum of the number of sub gain circuits corresponds to the number of phase shifters, and gains of the sub gain circuits are used to generate the high-gain wherein the control strategy comprises a user equipment state used to determine a priority, the user equipment state comprises a mobility of a user equipment, the base station provides the output signals associated with the RF paths with high-gain to the user equipment with a high priority and based on the mobility of the user equipment, and the priority indicates a priority to provide services to the user equipment.

13. The communication system as claimed in claim 12, wherein the adjusting circuit comprises a plurality of switching circuits, each having a plurality of first terminals, a second terminal and a control terminal, wherein the first terminals of the switching circuits are coupled to the radio frequency circuits, and the control terminals of the switching circuits receive the control signals;

wherein the plurality of phase shifters are correspondingly coupled to second terminals of the switching circuits; and wherein the plurality of gain circuits are correspondingly coupled to the phase shifters and the antennas; and wherein the number of first terminals of the switching circuits corresponds to the number of radio frequency circuits.

14. The communication system as claimed in claim 13, wherein the gain circuits comprise a plurality of first sub gain circuits and a plurality of second sub gain circuits, the first sub gain circuits and the second sub gain circuits are correspondingly coupled to the phase shifters and the antennas, respectively, wherein the sum of the number of first sub gain circuits and the number of second sub gain circuits corresponds to the number of phase shifters, and gains of the first sub gain circuits are greater than gains of the second sub gain circuits.

15. The communication system as claimed in claim 14, wherein the first sub gain circuits, a part of the switching circuits, a part of the phase shifters, a part of the antennas and a part of the radio frequency circuits form a first group, and the second sub gain circuits, another part of the switching circuits, another part of the phase shifters, another part of the antennas and another part of the radio frequency circuits form a second group.

16. The communication system as claimed in claim 14, wherein the first sub gain circuits, a part of the phase shifters and a part of the antennas form a plurality of first groups, the phase shifters of the first groups are correspondingly coupled to the switching circuits, the second sub gain circuits, another part of the phase shifters and another part of the antennas form a plurality of second groups, and the phase shifters of the second groups are correspondingly coupled to the switching circuits.

17. The communication system as claimed in claim 13, wherein the control strategy further comprises at least one of a signal emission schedule, a signal transmission distance, a bandwidth efficiency and an energy efficiency, or a combination thereof.

18. The communication system as claimed in claim 13, wherein the processing circuit further provides a plurality of test signals to the at least one user equipment through the antennas, such that the least one user equipment generates a plurality of return signals in response to the test signals, and the processing circuit receives the return signals through the antennas and establishes the control strategy according to the return signals.

* * * * *